Jan. 17, 1939.   S. D. GEHMAN   2,144,592
PROTECTION OF MILK BOTTLES, ETC
Filed Sept. 4, 1934
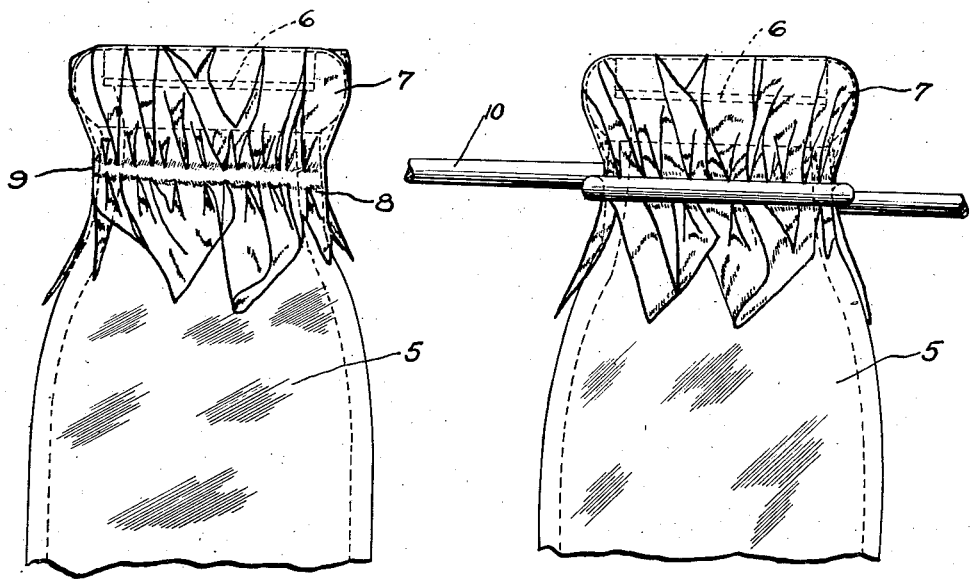
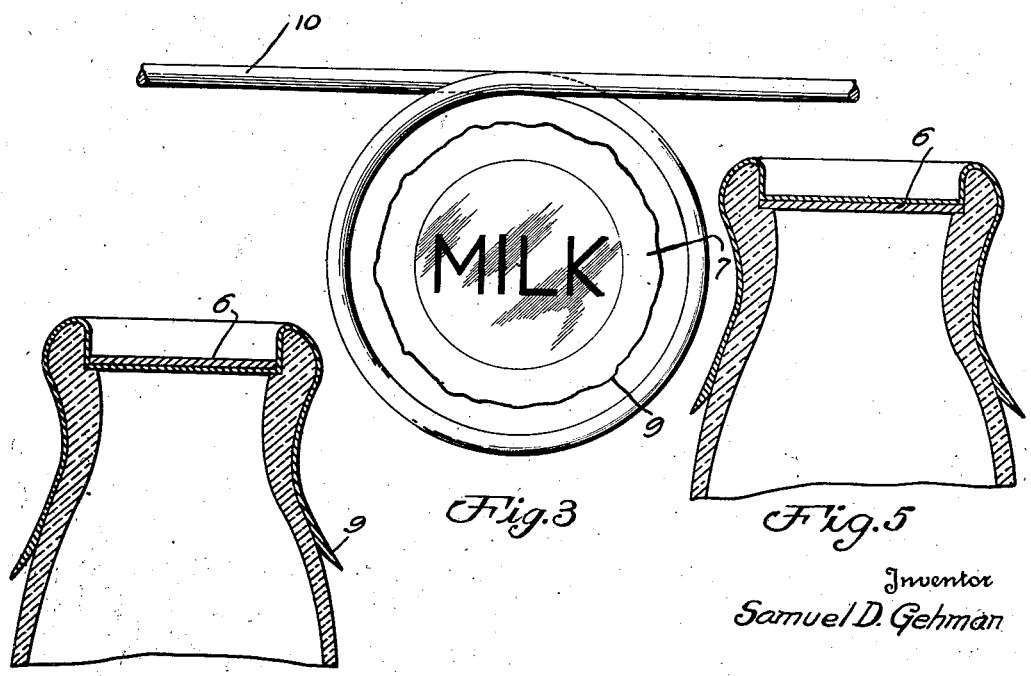
Inventor
Samuel D. Gehman
By R. H. Waters
Attorney Patented Jan. 17, 1939

2,144,592

UNITED STATES PATENT OFFICE 2,144,592

PROTECTION OF MILK BOTTLES, ETC.

Samuel D. Gehman, Akron, Ohio, assignor to Wingfoot Corporation, Wilmington, Del., a corporation of Delaware Application September 4, 1934, Serial No. 742,538

2 Claims. (Cl. 226—83)

This invention relates to the protection of the mouths of bottles, particularly milk bottles and the like, to keep them clean and dry. It relates to the formation of protective coverings or caps on bottles. More particularly the invention relates to the protection of the mouths of milk bottles by a heat-sealable, transparent, waterproof film of hydrohalogenated rubber. The process may be carried out with other heat-sealable materials such as halogenated rubbers, cellulose acetate and the like. The invention will be described in connection with the use of a film of hydrohalogenated rubber.

The necessity of protecting the mouths of milk bottles from dust and dirt has long been recognized and many means for accomplishing this result have been suggested. Few of these suggestions have met with any considerable commercial success, and these few are expensive to manufacture and apply, and have not been entirely satisfactory. So far as I am aware, none of the few caps which have met with commercial success have been waterproof so as to protect the mouths of the milk bottles from contamination by water, such as water produced by the melting of ice used to cool the milk, etc.. Although the use of paraffin, etc., has been suggested for waterproofing protective paper coverings, such materials as paraffin are not satisfactory for use on milk bottles and other bottles which are to be refilled, because paraffin and similar substances which adhere to the glass of the bottles, when melted off of the bottles in washing contaminate the wash water and are re-deposited in the interiors of the bottles.

Most bottles are formed with a protruding lip at or near the mouth to facilitate handling. According to this invention, the mouth of such a bottle, and in the preferred form of the invention, the mouth of a milk bottle, is covered with a film of hydrohalogenated rubber. The film is systematically or haphazardly folded down over the protruding lip of the bottle and contacted at the neck of the bottle below the lip and there held in place by heating the overlapping portions of the covering to cause them to adhere to one another.

The film covering is composed largely or entirely of a hydrohalogenated rubber which contains sufficient halogen and hydrogen to form a product which can be peeled from glass even though thermally sealed thereto. As films of rubber saturated with a halogen or hydrohalide such as chlorine or hydrochloric acid are brittle the films used must contain only the amount of halogen or halogen and hydrogen required to give a film sufficiently flexible to be folded without cracking. Plasticizers, etc. may be added as required.

The protective covering or cap is made from a rubber hydrochloride sheet, preferably about one thousandth of an inch thick, which may be formed as follows:

Twenty pounds of dry plasticized pale crepe rubber are dissolved in sufficient benzene to give a rubber cement of approximately 6% concentration. Dehydrated benzene is ordinarily to be preferred to commercial benzene which contains a trace of water. The cement is preferably cooled to about 10° C. and hydrogen chloride gas introduced with agitation. The gas is passed into the solution until the increase in weight of the composition due to the hydrogen chloride is approximately 11.6 pounds. When the desired increase in weight has been obtained the introduction of hydrogen chloride is discontinued and the mass is allowed to stand in order that the excess hydrogen chloride dissolved in the cement may react with the rubber. The reaction mixture is sampled from time to time and when the rubber hydrochloride contains about 29 to 30.5 percent of combined chlorine the excess hydrogen chloride may be neutralized with ammonia or other alkali.

At this stage of the process it is advantageous to add a photochemical inhibitor, which prevents the material from rapidly becoming brittle. One and one-half percent of hexamethylene tetramine and 3% methylene amino acetonitrile is satisfactory for this purpose. Small amounts of either of these compounds prolongs to some extent the time required for embrittlement of the film. Other compounds which may be used include ditetrahydro furfuryl-amine, dicyclo hexylamine, cyclohexyl amine - formaldehyde, cyclohexyl amino acetonitrile, tetramethyl thiuram disulfide, diphenyl guanidine, dihydroxy diphenyl propane, and mixtures thereof. A film of rubber hydrochloride which contains no photochemical inhibitor may be used on a milk bottle if it is put on the bottle before it becomes brittle, because no substantial decomposition of the hydrochlorinated rubber will take place under ordinary conditions in the short interval between the time when the milk is bottled and capped and the time when the cap is removed and the bottle opened for use. A film of rubber hydrochloride used for the protection of pharmaceutical bottles and other bottles which are apt to be stored before use, should contain some photochemical inhibitor.

The rubber hydrochloride film may be made from any suitable cement from which excess hydrogen chloride is removed. After neutralization or other removal of the hydrogen chloride it may be found desirable to steam distill the reacted cement to remove the solvent, then wash the rubber hydrochloride on a rubber washer and dissolve the purified product, together with a photochemical inhibitor, if any is to be employed, in a suitable solvent such as chloroform. The rubber hydrochloride film may be made from such a cement by spreading it as a thin film on a nitrocellulose belt or other flat surface and then allowing the solvent to evaporate.

Plasticizers may be added to the film rubber hydrochloride or cellulose acetate or other film-forming material alter its properties. This plasticizer employed may be a waterproofing aid, such as paraffin wax. The plasticizer may to some extent affect the softening point of the film. Ordinarily, a temperature of 100–120° C. will cause the partially saturated rubber hydrochloride above described to become sufficiently sticky to cause overlapping layers of the film to stick to one another. A heated collar of this temperature placed around the neck of the bottle will quickly form a seal. By prolonging the heating at this temperature the rubber hydrochloride film may be caused to adhere somewhat to the glass bottle, but such adhesion of the protective covering to the bottle is unnecessary, and will ordinarily as in the case of milk bottles, be undesirable. For milk bottles a material which is quickly heat-sealed at a temperature of about 100–150° C. will generally be preferred.

The invention will be further illustrated in connection with the accompanying drawing in which Fig. 1 shows an ordinary milk bottle with a protective cap heat-sealed in place and Figs. 2 and 3 illustrate the manner of forming the cap on the bottle. Figs. 4 and 5 illustrate modifications of the invention.

The bottle 5 is sealed in the usual way by an ordinary stiff paste board or other suitable sealing cap 6. The rubber hydrochloride film is advantageously supplied to the machine as a continuous sheet which is cut into squares from which the caps are formed. A wide sheet which is cut into a narrow sheet and then into squares as a part of the capping operation, may be used. However, the caps may be circular or of any desired shape. To form the protective cap, the rubber hydrochloride film preferably in the form of a perfectly flat square is placed on the top of the bottle. The portion of the film which extends beyond the lip 7 of the bottle is then bent down around the neck 8 and the overlapping layers of the film are heat sealed to one another to form the protective cap 9. This is advantageously done by a heated loop which may be a flat band wound spirally with resistance wire suitably covered, or a loop of other suitable material which may for example be copper tubing which may be kept hot by the ciculation of steam through it. If a wire is used it may be kept hot by the passage of an electric current through it, or by passing it through a flame before looping it around the bottle. Or by heating the wire at or near the ends, by a flame or other suitable means, the loop may be kept at the proper temperature for heat sealing.

The heated loop may be lowered vertically over the mouth of the bottle or it may be pivoted in such a way as to swing down over the mouth of the bottle or the bottle may be raised up into it. Fig. 3 is a plan view showing the loop in an expanded position and having a larger diameter than the lip 7 of the bottle. It is in this position before being brought into heat-sealing position and again in being removed from the bottle. When the bottle and heated loop are brought into such position that the loop encircles the neck, the loop is contracted so that it presses tightly against the neck of the bottle as shown in Fig. 2. In this position the overlapping portions of the film are heat-sealed to one another without causing adhesion of the film to the bottle. The loop is then again expanded and removed from the bottle. Fig. 3 shows the loop being removed from the bottle after the protective cap 9 has been completely formed.

The heat-sealing element 10 is used to shape the protective cap and to contract it around the neck of the bottle. Although the loop 10 is sufficiently hot to heat-seal the film when tightly pressed against it for a short period of time, it is in sliding contact with the film when it is used to fold the film down over the mouth of the bottle and contract it at the neck, and this operation is performed so quickly that no heat-sealing or undesirable deformation of the film occurs as a result of contact with the heated loop. By tightening, the loop is pressed tightly against the film and the film is rapidly heat-sealed. It may be advantageous to heat-seal the film some little distance below the lip of a milk bottle so as to allow the protective cap 9 to be slipped up and down the neck of the bottle without breaking the seal, so that if the milk becomes frozen, as it may in cold weather, and a frozen column of its rises out of the mouth of the bottle, the protective cap may rise with it without breaking the seal, and thus protect it from dust, etc.

A great many different methods of forming such a protective cap may be employed. The sheet of protective material may, for example, be regularly plaited as it is brought down around the neck of the bottle, or the overlapping folds may be formed haphazardly, as described. The film or sheet may be preformed, by plaiting, before being placed over the mouth of the bottle, but this is unnecessary.

Instead of the heated loop, several different collars or encircling devices of various shapes may be utilized to seal the overlapping portions of the film to one another. This sealing may be done at different heights and the material may be sealed together immediately below the lip of the bottle or the seal may be formed some little distance, e. g. ½ inch or somewhat more, below the lip of the bottle. In any event the protective material is heat-sealed and in such a way that the heat-sealed portion is of less diameter than the lip of the bottle. The collar or other apparatus employed for the heat-sealing may be engraved or embossed or may be inked so that a marking operation is combined with the sealing operation.

The films which are preferred for thus covering milk bottles are transparent and the printed matter usually present on the sealing cap 6 is therefore readily discernible through the transparent film material. If materials having some opacity are employed they may be sealed to the top of the sealing cap 6 before this cap is put in place in order to make any printed matter on the sealing cap more readily discernible as shown in Fig. 5. This seal may be a heat-seal or any suitable cement or adhesive may be employed as desired. In this case the protective cap will be brought up over the lip 5 of the bottle, and instead of being stretched tight across the top of the bottle as in the preferred form of the invention shown in Fig. 1, the film will be depressed in the mouth of the bottle and fastened to the sealing cap 6. Even though a transparent film material is employed such a protective cap may be desirable particularly if the bond between the protective film and the sealing cap 6 is sufficient to permit removal of the cap with, and by means, of the protective cap.

In another form of the invention, at shown in Fig. 4, the protective film from which the cap is to be formed is placed over the mouth of the bottle before the sealing cap 6 is forced into place and the protective cap then separates the contents of the bottle from the sealing cap 6. This exposes any printing on the cap 6 directly to view. By this form of the invention when applied to a milk bottle the sealing cap 6 may be removed when the protective cap 9 is broken and removed from the bottle. Such an arrangement may also be desirable when the protective cap to which this invention relates is applied to a bottle fitted with a cork in order to prevent the contents of the bottle from contacting with the cork.

It has previously been suggested to apply preformed caps of regenerated cellulose to bottles such as liquor bottles which are intended to protect the contents of the bottle until the cap is destroyed. However, it has been found that in the illicit liquor traffic, such caps have been swollen by soaking in water and the contents of these bottles have been tampered with as by "cutting" or diluting and the caps still intact have been replaced and again shrunken tight over the bottles by allowing them to dry out. The caps of the present invention are not capable of removal and replacement and they are therefore particularly well suited for use as seals where the sheets or films from which they are made bear distinctive markings or where distinctive markings are impressed into them during the heat-sealing operation.

In the preferred form of the invention the protective caps are made of transparent material which allows inspection of the mouth of the bottle without removing the cap. They may be suitably colored if desired as by the use of a soluble dyestuff or insoluble material of transparency is not required.

Although the preferred form of the invention relates to protecting milk bottles, other bottles, such as pharmaceutical bottles, cosmetic bottles, liquor bottles or other bottles which are to be sealed and kept clean may be similarly protected by heat-sealing a protective covering around the neck below the lip. Such caps may be applied to bottles with various types of lips, such as flaring lips, etc. By lip I mean a portion of larger diameter than the neck around which the heat-seal is to be formed, located between the mouth and that portion of the neck around which the seal is to be formed. The neck may, for example, have two or more sections of narrower diameter at which the bottle is sealed and between which there is a portion of a larger diameter in order to produce an effect not readily obtained by any of the usual methods of sealing. It will thus be seen that the invention may be applied to bottles of quite different shapes used for packaging a great variety of materials. It is not necessary that the protective covering enclose all of the top of the bottle down to the heat-seal. The covering may be only sufficiently large to cover the top surface of the bottle, with protruding portions on all sides which are brought together and heat-sealed at the neck. However, in the preferred form of the invention, the covering is a cap which encloses and protects the whole of the upper part of the bottle down to the neck.

I claim:

1. The method of forming a protective cap on a bottle which comprises placing a sheet of a material capable of being heat-sealed over the mouth of the bottle, folding portions of the sheet which extend beyond the lip of the bottle to the neck of the bottle by causing the bottle and an expanded loop of heated material to change their relative positions so that the loop encircles the mouth of the bottle and then the neck of the bottle, and then contracting the loop to fold portions of the protective sheet against the neck of the bottle and heat-seal overlapping layers of the sheet to one another.

2. The method of forming a protective cap around a bottle which comprises covering the mouth of the bottle with a protective film which is capable of being heat sealed, bringing portions of the film which overlap the mouth of the bottle against the neck of the bottle and heat-sealing portions of the film which overlap one another by contracting a heated loop over the film and against the neck of the bottle.

SAMUEL D. GEHMAN.

CERTIFICATE OF CORRECTION.

Patent No. 2,144,592.                                    January 17, 1939.

SAMUEL D. GEHMAN.

It is hereby certified that error appears in the printed specification of the above numbered patent requiring correction as follows: Page 2, first column, lines 13 to 15, strike out the words "rubber hydrochloride or cellulose acetate or other film-forming material" and insert instead the word to; page 3, first column, line 11, for the word "at" read as; line 50, for "of" read if; and that the said Letters Patent should be read with this correction therein that the same may conform to the record of the case in the Patent Office.

Signed and sealed this 6th day of June, A. D. 1939.

Henry Van Arsdale (Seal)                                          Acting Commissioner of Patents.